(12) United States Patent
Lang et al.

(10) Patent No.: US 10,091,851 B1
(45) Date of Patent: Oct. 2, 2018

(54) DUAL PATHWAY LED DIMMER

(71) Applicant: Intel IP Corporation, Santa Clara, CA (US)

(72) Inventors: Tobias Lang, Seefeld (DE); Klaus Doth, Krailing (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/842,941

(22) Filed: Dec. 15, 2017

(51) Int. Cl.
*H05B 33/08* (2006.01)

(52) U.S. Cl.
CPC ..... *H05B 33/0845* (2013.01); *H05B 33/0815* (2013.01); *H05B 33/0857* (2013.01)

(58) Field of Classification Search
CPC .......................... H05B 37/02; H05B 37/0218; H05B 37/0227; H05B 33/08; H05B 33/0815; H05B 33/083; H05B 33/0851; H05B 33/0845; H05B 33/0857; H05B 33/0866; H05B 33/0869

USPC ........ 315/151–153, 185 R, 209 R, 291, 294, 315/307, 308, 312
See application file for complete search history.

(56) References Cited

U.S. PATENT DOCUMENTS

2012/0313545 A1* 12/2012 Courtel .............. H05B 33/0815 315/250

* cited by examiner

*Primary Examiner* — Jimmy Vu
(74) *Attorney, Agent, or Firm* — Viering, Jentschura & Partner mbB

(57) ABSTRACT

Herein is disclosed a dual-pathway LED dimmer, including a first reference voltage node; a load including one or more light emitting diodes, the load connected in series with the first reference voltage node; a second reference voltage node; a first load pathway and a second load pathway, connected in parallel between the load and the second reference voltage node; wherein the first load pathway includes a first inductor and a first transistor, connected in series; and wherein a second load pathway includes a second inductor and a second transistor, connected in series; and one or more controllers, configured to control the first transistor and the second transistor.

20 Claims, 8 Drawing Sheets

DUAL PATHWAY LED DIMMER

TECHNICAL FIELD

Various aspects of the disclosure relate generally to the management of large dynamic ranges within a dimmer.

BACKGROUND

Existing light emitting diode ("LED") dimmers may rely on on-off-modulation that is then smoothed with an inductor coil, to avoid the perception of flickering. Conventional controllers may be able to provide acceptable dimming perception within a small dynamic range; however, a limited number of dimming settings with a conventional or low-bit controller may yield an undesirable perception of stepwise light changes in some brightness ranges, rather than a smooth diming procedure. Where a large dynamic range is required, the known method of dimming with an inductor coil on a single pathway may be unable to provide an acceptably smooth dimming perception across the dynamic range.

SUMMARY

Herein is disclosed a dual-pathway LED dimmer, including a first reference voltage node; a load including one or more light emitting diodes, the load connected in series with the first reference voltage node; a second reference voltage node; a first load pathway and a second load pathway, connected in parallel between the load and the second reference voltage node; wherein the first load pathway includes a first inductor and a first transistor, connected in series; and wherein a second load pathway includes a second inductor and a second transistor, connected in series; and one or more controllers, configured to control the first transistor and the second transistor.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

Figure 1:
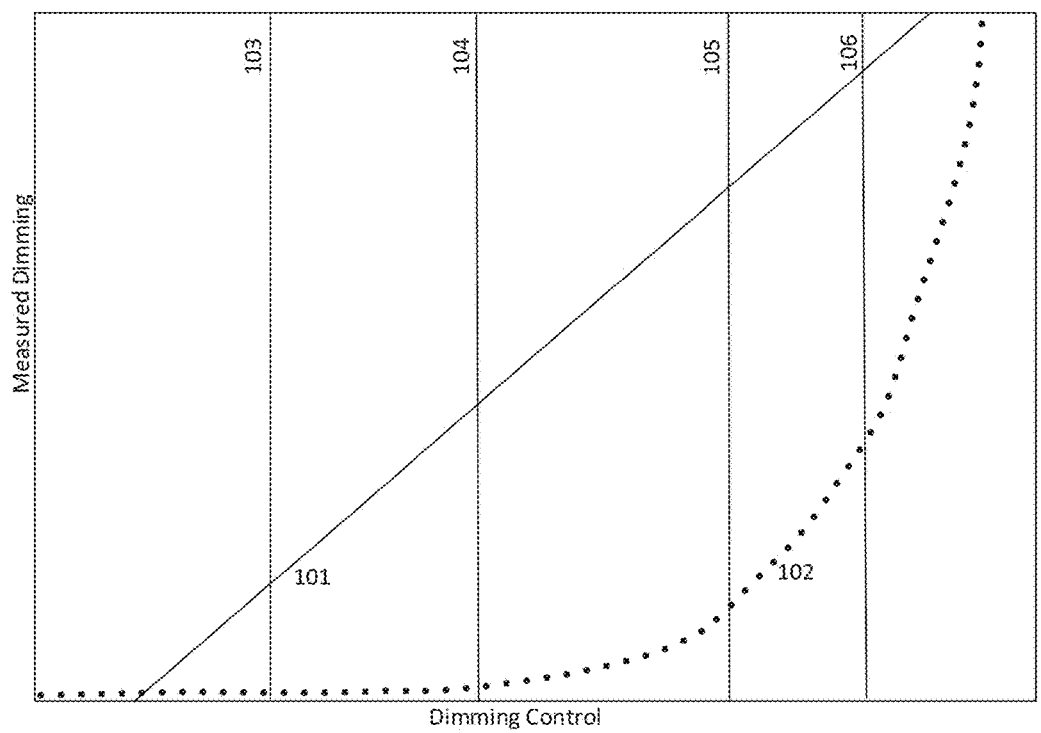
FIG. 1 shows a linear and a logarithmic lighting control curve.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration." Any aspect of the disclosure described herein as "exemplary" is not necessarily to be construed as preferred or advantageous over other aspects of the disclosure.

Throughout the drawings, it should be noted that like reference numbers are used to depict the same or similar elements, features, and structures.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

It is understood herein that a "dynamic range" may a range between a smallest light output (brightness) and greatest light output (brightness). Where a dimming technology with a finite number of dimming settings is described herein, and assuming hypothetically an equal distribution of the dimming settings across the dynamic range, the change in absolute brightness between each of the dimming settings is referred to as a "step increment." Thus, where a finite number x of dimming settings are distributed across a large dynamic range, the resulting step increment will be comparatively large. Where the same finite number x of dimming settings are distributed across a small dynamic range, the resulting step increment will be comparatively small. As will be described herein, this dimmer includes two pathways: a first pathway to dictate a large step increment, and a second pathway to dictate a small step increment. Various techniques are known for dimmer operation, including, but not limited to linear regulators and on-off-modulation. Each technique offers a set of trade-offs which may be appropriate in certain applications and inappropriate in others. In some implementations, LED lights may require dimming across a broad dynamic range. Where a sufficiently large dynamic range is required, known dimmer technologies may be unsuitable.

In a given LED installation, it may be desirable to dim the LED lights. It is known to use linear regulators for dimming. Linear regulators may provide a smooth, flicker-free diming, but with the trade-off of low energy efficiency. This may be particularly detrimental in an unmanned aerial vehicle ("UAV"), which has a limited battery capacity, and whose functional use depends largely upon its battery life.

For improved energy efficiency, it is known to use on-off-modulation to dim an LED light. Mere on-off-modulation, as such, may result in a flickering effect, due to the human eye's ability to perceive certain rapid changes in LED brightness. This may be magnified where the light source is moving, such as in a UAV light show. Such a flickering effect may be undesirable for an LED implementation. The flickering effect can often be reduced by including an inductor in the dimmer, which smooths the diming function by releasing a stored charge during an off cycle.

Conventional on-off-modulation, however, may yield an undesirable result where a large dynamic range is required. One instance where a large dynamic range may be necessary is in the context of a UAV light show. To achieve the desired excitement during a UAV light show, UAVs are programmed to adjust their lights from barely glowing to extremely bright. This large dynamic range presents particular challenges in achieving a smooth and linear perception of UAV light dimming by a human observer.

The human eye perceives light dimming logarithmically rather than linearly. Otherwise stated, the relationship between stimulus and perception is logarithmic. With respect to light, where a light status varies as a geometric progression, such as being multiplied by a fixed factor, the human eye perceives the changed stimulus in an arithmetic progression, such as adding constant amounts. Accordingly, the stimulus input required to achieve arithmetic, stepwise progressions of perception grow exponentially larger as the stimulus increases. With respect to changes in light brightness (dimming), stepwise perceived increments of light brightness require comparatively small increases of light magnitude for a relatively dim light, whereas stepwise perceived increments of light brightness require comparatively large increases of absolute light magnitude for a relatively bright light. Thus, a linear increase of brightness will be perceived as a rapid initial increase, which slows to a gradual increase.

This presents a challenge for large dynamic ranges. Commercial LED dimming controllers offer a limited number of dimming settings. Greater numbers of settings may correspond with increased cost, size, or weight, which may be detrimental in a given LED implementation. One kind of conventional controller, for example, may be a 7-bit controller, which may offer 128 controller settings. Although limited dynamic ranges may be sufficiently controlled by a 7-bit controller, the available controller settings may be unsatisfactory for large dynamic ranges. For example, if the dimmer is configured such that the controller settings correspond to sufficiently small increments to result in smooth light output transition in the low-power range, there may be insufficient settings to address a high-power range, thereby truncating a desired dynamic range. Where the dimmer is configured to cover a large range between zero power and maximum power, the low-power settings may require sufficiently large jumps as to cause a perception of jagged stepwise increases, rather than a smooth diming transition.

FIG. 1 shows an approximation of a difference between a logarithmic progression and a linear progression. A human perception of dimming change 101 is displayed relative to an absolute light magnitude 102. Although not drawn to scale, FIG. 1 demonstrates that marginal increases in light magnitude within a dimmer range are perceived as stepwise, linear increases by the human eye. Moreover, within a bright range, much larger increases in light magnitude are required for similar stepwise perception. This is demonstrated, for example, between points 103 and 104, wherein 103 makes a relatively dim light, and 104 marks a linear progression in perception of the brightness of said light, but with a comparatively small change in absolute light magnitude. In comparison, 105 shows a comparatively bright light, and 106 shows a stepwise increase of human perception of the comparatively bright light, which requires a much larger increase in the absolute magnitude of light.

Figure 2:
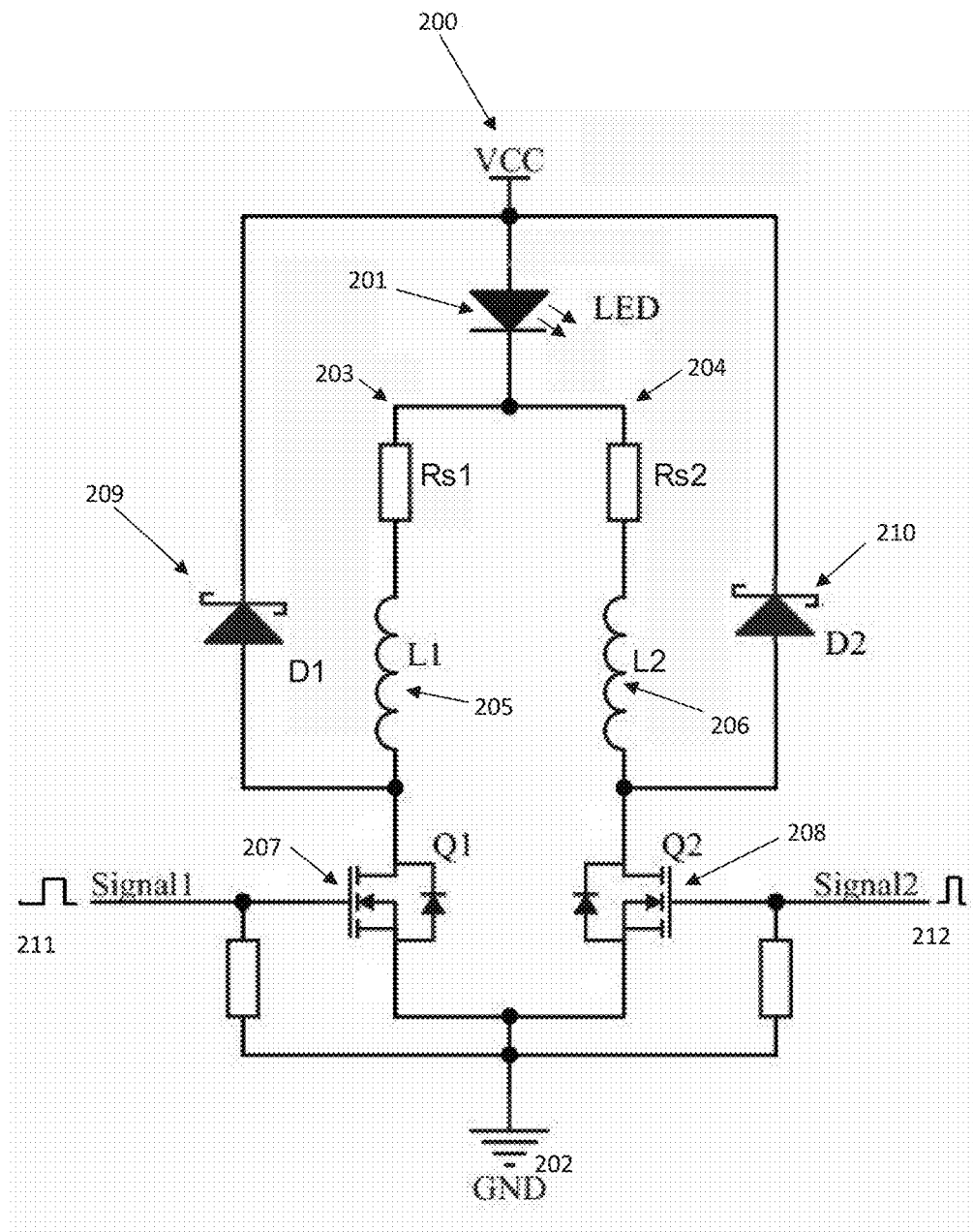
FIG. 2 shows a dimmer, according to an aspect of the disclosure.

FIG. 2 shows a dimmer configuration according to an aspect of the disclosure. The dimmer configuration includes a power input node 200 or first voltage reference node, which is connected in series to a load 201, which is marked in this case as an LED. The dimmer further includes a ground node 202 or second voltage reference node. A first load pathway 203 and a second load pathway 204 are connected in parallel between the load 201 and the ground node 202 or second voltage reference node. The first load pathway includes a first inductor coil 205 and a first transistor 207, connected in series. The second load pathway includes a second inductor 206 and a second transistor 208 connected in series. An additional electrical connection leads from each load pathway to the load input. Along each of these electrical connections, a diode 209 and 210 is present, which permits a current flow from the load pathway to the lead input. In FIG. 2, two Schottky diodes are depicted, which may be configured to permit current to flow from the first inductor coil or the second inductor coil to the load input. The selection of a Schottky diode as the diode in 209 and 210 may be advantageous because of the Schottky diode's ability to perform rapid switching without the recovery time associated with a conventional p-n diode. A controller (not pictured) provides control signals for the transistor operation. Specifically, control signal one 211 controls transistor one 207, and control signal two 212 controls transistor two 208. The controller and control signals 211 and 212 are configured to cause either transistor one 207 or transistor two 208 to be on. The on times of transistor one 207 and transistor two 208 do not overlap.

Using the first load pathway as an example, the first transistor 207 receives a control signal 211 to control the first transistor 207 to be on. During this on-phase, the first transistor 207 allows current to flow from the power input node 200 or first voltage reference node, through the LED load 201, and into the first inductor coil 205. During this on-phase, the first inductor coil 205 stores a portion of its received current in a magnetic field. When the first control signal 211 causes the first transistor 207 to switch to an off-phase, current ceases to flow into the first load pathway 203 from the power input node 200 or first voltage reference node. The first inductor coil 205 resists the decrease in current by releasing the current stored within its electromagnetic field. This stored current travels from the first inductor coil 205 through the first diode 209 and into the load 201.

Similarly, when the first control signal 211 causes the first transistor 207 to enter an off-phase, the second control signal 212 may cause the second transistor 208 to enter one or more on-phases. During an on-phase of the second transistor 208, current may flow from the power input node 200 or first voltage reference node through the load 201, and into the second inductor coil 206. The second inductor coil 206 resists the additional flow of current by storing current within a magnetic field. When the second control signal 212 causes the second transistor 208 to switch to an off-phase, the second inductor 206 resists the change in current by releasing its stored charge. The stored current exits the second inductor coil 206 and travels through the second diode 210 into the load 201.

In this manner, the controller signals only one of the transistors 207 or 208 to be on at a time. The on and off cycles of the two transistors 207 and 208 switch at a frequency designed to cause the desired dimming effect. In this way, the current flowing into the load 201 is the addition of the current flowing from the power input node or first voltage reference node and from a current being discharged from an inductor. Thus sum total of current powers the LED load 201.

The first load pathway 203 is configured for large step increment dimming, and the second load pathway 204 is configured for a small step increment dimming. The second load pathway 204 may be configured for a small step increment dimming, the dynamic range of which corresponds to a single step increment of the first load pathway 203. The first induction coil 205 and the second induction coil 206 may be of differing lengths, areas, and/or number of coil windings and may be selected to accommodate the high dynamic range and the low dynamic range of the first load pathway and the second load pathway respectively, the dynamic range being at least a function of a frequency at which the corresponding transistor is in an on-phase. The load's dynamic range may range from zero to the brightness resulting from a first transistor remaining in the on-phase. As will be described in greater detail, infra, the first transistor 207 and the second transistor 208 are configured to be operated using one or more controllers, which are designed to switch between a current traveling through the first inductor and a current travelling through the second inductor.

Figure 3:
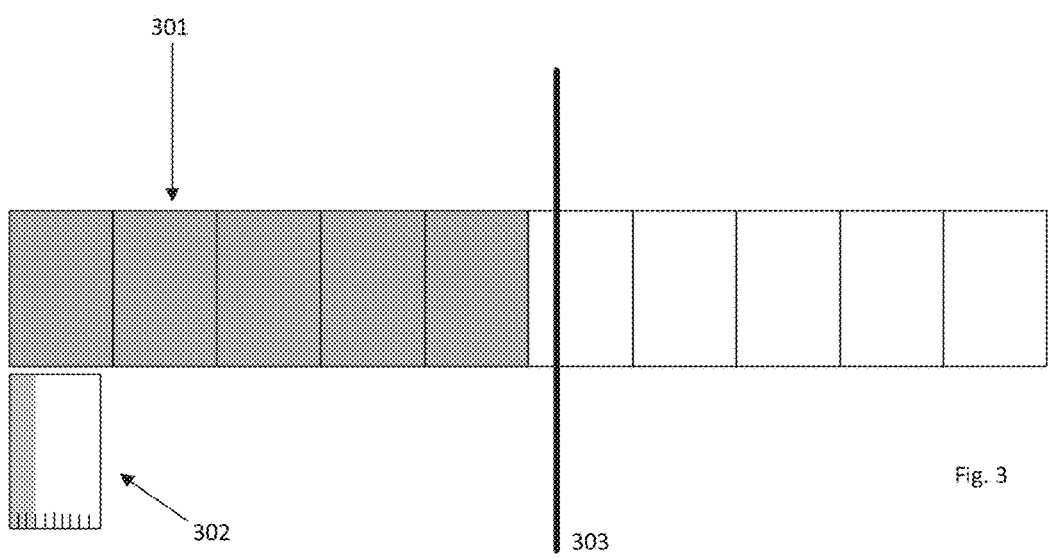
FIG. 3 shows dynamic range control of an LED according to a combined large step increment and small step increment portion.

FIG. 3 shows a control of an output current based on a switching between a first load pathway and a second load pathway. The two horizontal rows depicted in FIG. 3 show a dynamic range of a first inductor 301, and a dynamic range of a second inductor 302. For simplicity, the dynamic ranges are depicted as each having ten available linear or stepwise settings. It is noted that many conventional controllers will offer a number of settings in excess of ten. For example, a conventional 7-bit controller may offer 128 settings. Ten steps are depicted herein for ease of demonstration, and the depiction of ten steps is not intended to be limiting in any way. The first inductor 301 is selected for a large dynamic range, and the second inductor 302 is selected for a small dynamic range. The first inductor 301 has a dynamic range that is depicted as ten rectangular blocks. The second inductor 302 has a dynamic range that is depicted as slightly less than one rectangular block. This ratio is provided merely as an example, and the ratio of dynamic range of the first inductor 301 to the second inductor 302 may be any percentage or ratio as is desired for the implementation and as available by the given controller.

The current transmitted to each of the two inductors is dictated by at least one controller. Controller devices may be limited in their dynamic range, such as a 7-bit controller offering 128 stepwise increments within its dynamic range. In this case, and for simplicity and demonstrative purposes, the number of steps is depicted as ten, although the number of steps available for any given controller may be greatly in excess of ten. Ten steps for the dynamic range of the first inductor 301 may result in noticeable stepwise dimming of an LED. This may be particularly true in the lower light regions of the dynamic range, due to the logarithmic nature of visual perception, whereby very small changes in absolute light output within the lower light region may be perceived as comparatively large stepwise changes. Particularly where a large dynamic range is necessary, the number of available settings operating with a single load pathway may be insufficient to achieve a perception of smooth brightness transition across the entire dynamic range. Thus, where the dynamic range is great, it must be possible to achieve very small changes in light output at the lower portion of the dynamic range, where a perception of gradual change in light intensity is desired. The necessary small changes may be impossible for a single conventional controller operating with a single load pathway.

301 shows the first load pathway receiving a signal to cause the load to illuminate with approximately 50% of the load's dynamic range. The next available stepwise increase would be 60% of the load's dynamic range. Where this 10% stepwise jump is undesirable, however, a smaller increase can be obtained with the second load pathway 302. Because the second load pathway is configured for a more limited dynamic range, the ten stepwise increments available for the second load pathway 302 correspond to smaller increases in brightness. In this case, and again for simplicity and demonstrative purposes, each of the ten stepwise increments available to the second load pathway 302 corresponds to approximately 1% of the dynamic range of the first load pathway 301. This ratio can be configured for a desired implementation. According to one aspect of the disclosure, the second load pathway's dynamic range corresponds to an available stepwise interval within the first load pathway. In this case, the second load pathway 302 is switched to 30% of its dynamic range. The controller's switching function between the first load pathway 301 and the second load pathway 302 causes an addition of the current output of each coil to be received by the load. Therefore, the controller can configure the combined current output to be an amount not individually reachable by the stepwise control functions available to the first load pathway 301. In this case, and for simplicity and demonstrative purposes, the combined current is shown at 53% 303, which is not individually obtainable by the first load pathway 301. The ability to combine a larger stepwise amount from a first load pathway 301 with a smaller stepwise amount from a second load pathway 302 permits greater control of the overall brightness, such that the combined use of the first load pathway and the second load pathway permit brightness control at a second load pathway's step increment across the dynamic range of the first load pathway.

Figure 4:
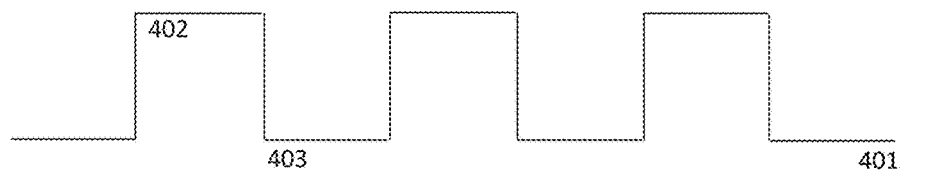
FIG. 4 shows a high step increment resolution signal and a small step increment signal.
Figure 4:
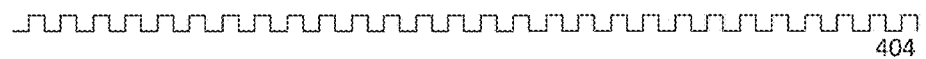
Figure 4:
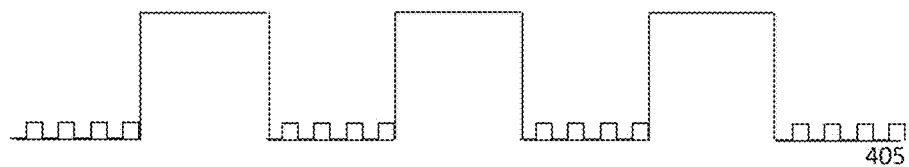

FIG. 4 shows individual and combined signals corresponding to the first load pathway and the second load pathway. The first load pathway is designated as a high-intensity pathway. The first signal 401 for the first load pathway is a signal at a first frequency $f_1$, wherein the first signal 401 is a large saw-tooth pattern including a high portion 402 and a low portion 403. The high portion is selected to cause the first transistor to enter an on-state, thereby allowing current to flow from the input node, into the load, and through the first load pathway. The low portion 403 is selected to cause the first transistor to enter an off-state, thereby precluding current from flowing from the input node, through the load, and into the first load pathway.

The second signal 404 occurs at a second frequency $f_2$, which may be greater or smaller than f1. As with the first signal 401, the second signal 404 includes a high portion and a low portion, which are configured to turn on and off the second transistor.

It is anticipated that the first transistor and the second transistor will not simultaneously be in an on-state. Thus, the high-portion of the second signal may only be delivered to the second transistor when the first transistor is in the off-state. This may be achieved by any means able to deliver the signals as desired. According to one aspect of the disclosure, the controller that produces the second signal will only deliver the second signal to the second transistor when the first signal causes the first transmitter to be in an off-state.

Figure 5:
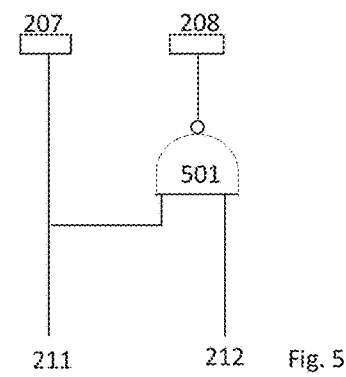
FIG. 5 show a control connection for non-current operational mode operation.

FIG. 5 shows a configuration according to another aspect of the disclosure to control the second signal to only be transmitted to the second transistor when the first transistor is in an off-state. As shown in this figure, the first signal 211 is delivered to the first transistor 207 and a NAND logic gate 501, to which the second signal 212 is also transmitted. Due to the nature of the NAND gate 501, a high first signal 211 will preclude the second signal 212 from being delivered. A low first signal 211 will permit the high second signal 212 to be delivered to the second transistor. The resulting signal will approximate the signal shown in FIG. 4.

Figure 6:
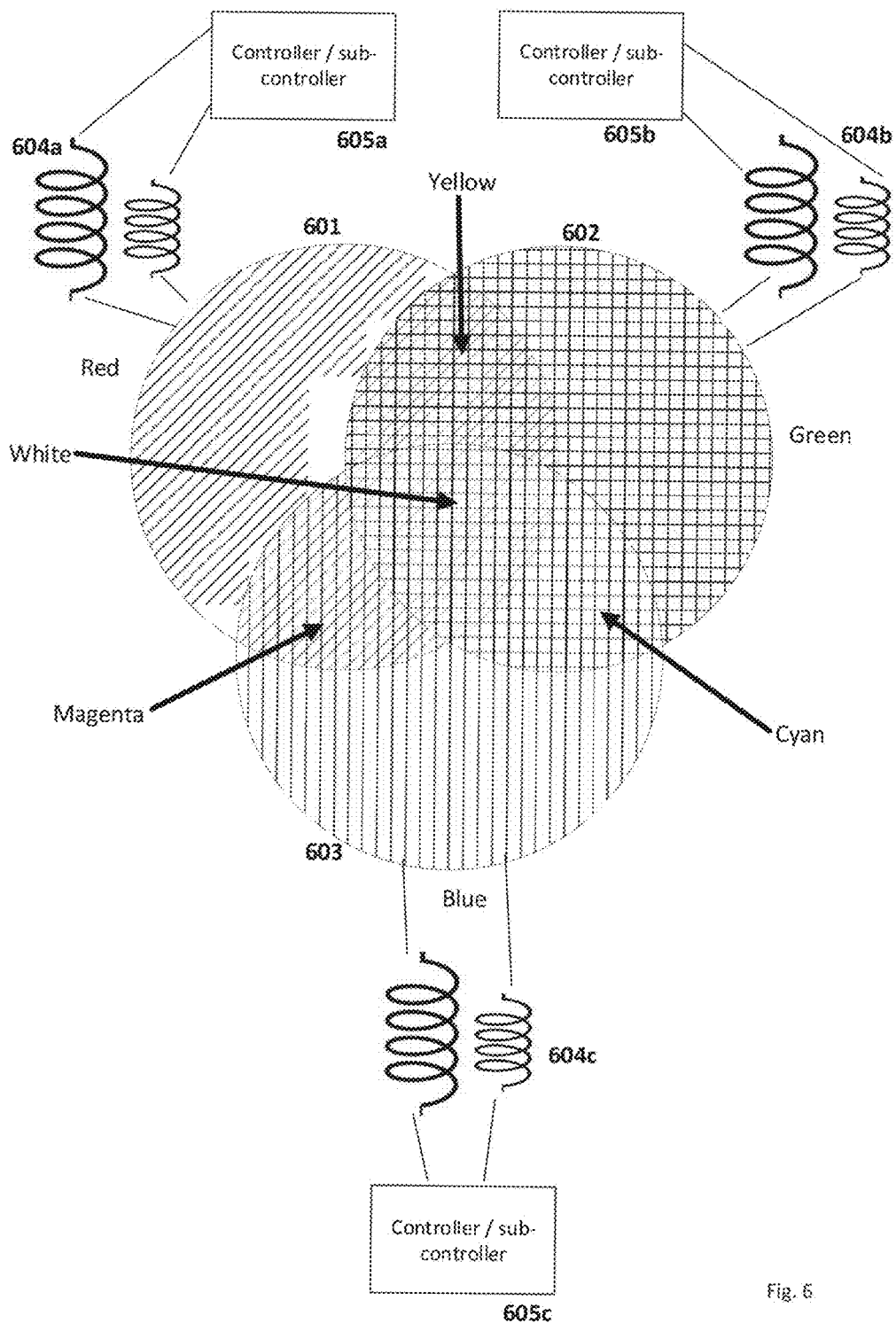
FIG. 6 shows a diming-based color-customization.

FIG. 6 shows a color implementation of the dimmer, according to an aspect of the disclosure. The dimmer may be required to control the color or hue, instead of or in addition to the brightness of a given light. This may be required, for example, in the context of a UAV light show, wherein a plurality of UAVs are controlled to alter not only a brightness of their lights, but also a hue. Under such circumstances, a UAV may be equipped with a plurality of LED lights, such as a red light, a green light, and a blue light, and one or more of said colored lights may be controlled by a dimmer as described herein. Where a plurality of LED light colors are mixed to create a combined light color output, changing the brightness (dimming) of even one color within the plurality of colors will change the combined light color output. According to one aspect of the disclosure, a color-adjustable light may be configured with three dimmers as disclosed herein, wherein a first dimmer corresponds to a red color, a second dimmer corresponds to a green color, and a third dimmer corresponds to a blue color. One or more dimmers may be controlled or adjusted as described herein, such that the brightness of at least one of the red, green, and blue colors can be controlled at a level of the second load pathway's step increment, thereby creating a high level of brightness control. The result is a highly customizable mixed color output which allows a very wide range of resulting hues. Although red, green, and blue lights may permit a highly adjustable result, an adjustable color light may be created with any two lights of different colors, and thus the references to red, green, and blue lights are not intended to be limiting.

Where such a color-adjustable light is included within one or more UAVs for a UAV light show, the three dimmers may operate individually or in a synchronized fashion to control both the overall brightness of the resulting light, as well as the hue of the resulting light. That is, even where the light originates from a plurality of red, green, and blue LEDs, a spectator located a distance away from the UAV will appreciate the light as a single combined color, said combined color being a result of the relative brightness of the red, green, and blue LEDs, as determined by the dimmers attached thereto.

In FIG. 6, a dimmer configuration to achieve the desired hue and brightness can be seen. In this case, the light includes at least a red light 601, a green light 602, and a blue light 603. It is known to combine red, green, and/or blue light colors to achieve a desired light color. For example, and as is shown on FIG. 6, red and green lights combine to form a yellow light; green and blue lights combine to form a cyan light; and blue and red lights combine to form a magenta light. Where customizable color is desired, each of the red, green, and blue lights may be configured with a dimmer as described herein, such that the relative brightness is of such lights can be controlled to yield a desired color and brightness. The dimmer control disclosed herein is depicted on FIG. 6 as a pair of inductor coils, as displayed by 604a, 604b, and 604c. In this case, the red light 601 is depicted as being controlled by a dual inductor dimmer as described herein 604a. The green light 602 is depicted as being controlled by a dual inductor dimmer as described herein 604b. The blue light 603 is depicted as being controlled by a dual inductor dimmer as described herein 604c. Each dual inductor pair is controlled by a controller or sub controller as depicted by 605a, 605b, and 605c, respectively. According to one aspect of the disclosure, a single controller may be used to control each of the red light 601, green light 602, and blue light 603. According to another aspect of the disclosure, each of the red light 601, green light 602, and blue light 603 may have a separate controller. According to yet another aspect of the disclosure, a single controller or processor may control a plurality of controllers or sub-controllers, whereby the red light 601 has a first sub controller 605a; the greenlight 602 has a second sub controller 605b; and the blue light 603 has a third sub controller 605c. With any of these arrangements, the brightness of one or more of the color lights may be controlled to achieve a desired, combined hue. Whether by an individual controller, or a series of separate controllers or sub controllers, the first transistor and second transistor corresponding to a color is switched on according to the first operational mode and the second operational mode, such that the current traveling to the load is a combined current corresponding to the current from the power input node or first voltage reference node and current from a discharge of an inductor.

Figure 7:
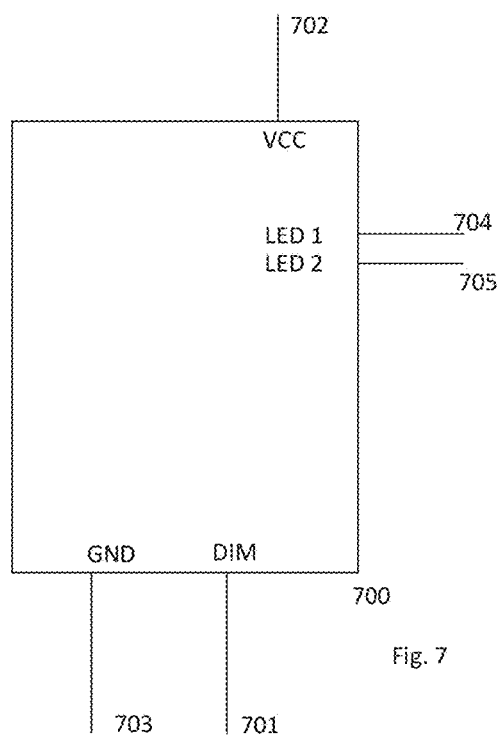
FIG. 7 shows a controller for dimmer control, according to an aspect of the disclosure.

FIG. 7 shows a dimmer controller 700, according to an aspect of the disclosure, whereby a single controller is equipped to produce a signal for the first transistor and a signal for the second transistor. It will be understood by a skilled person that a variety of LED dimmer controllers are known in the art, and the dimmer described herein is configured to operate with a variety of available controllers. Therefore, nothing in this disclosure should be understood to be limiting in terms of particular controller or type of controller used within this dimmer. For demonstrative purposes, however, a controller 700 is shown herein. This controller includes a DIM dimming connection 701, a GND ground connection 703 or second voltage reference node, a VCC power connection 702 or first voltage reference node, a first dimming output 704 and a second dimming output 705. The first dimming output 704 and second dimming output 705 are configured to provide control signals, which are transmitted to the first transistor and the second transistor respectively.

Figure 8:
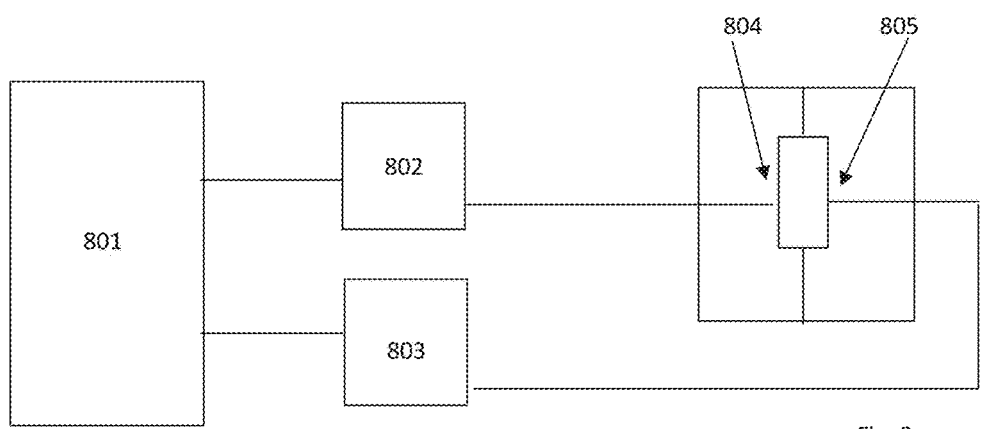
FIG. 8 shows a dimmer, according to another aspect of the disclosure, with a processor and two controllers.

FIG. 8 shows dimmer configuration according to another aspect of the disclosure, wherein a first controller generates a first control signal and a second controller generates a second control signal. According to this configuration, a processor 801 divides a desired brightness into a high portion and a low portion, said high and low portions corresponding to the first signal and the second signal, respectively. The processor transmits a command to a first controller 802 and a second controller 803 to cause the first controller 802 and the second controller 803 to generate the desired signals. The first controller 802 and the second controller 803 generate the corresponding control signals and transmit the control signals to the first transistor 804 and of the second transistor 805, respectively.

Figure 9:
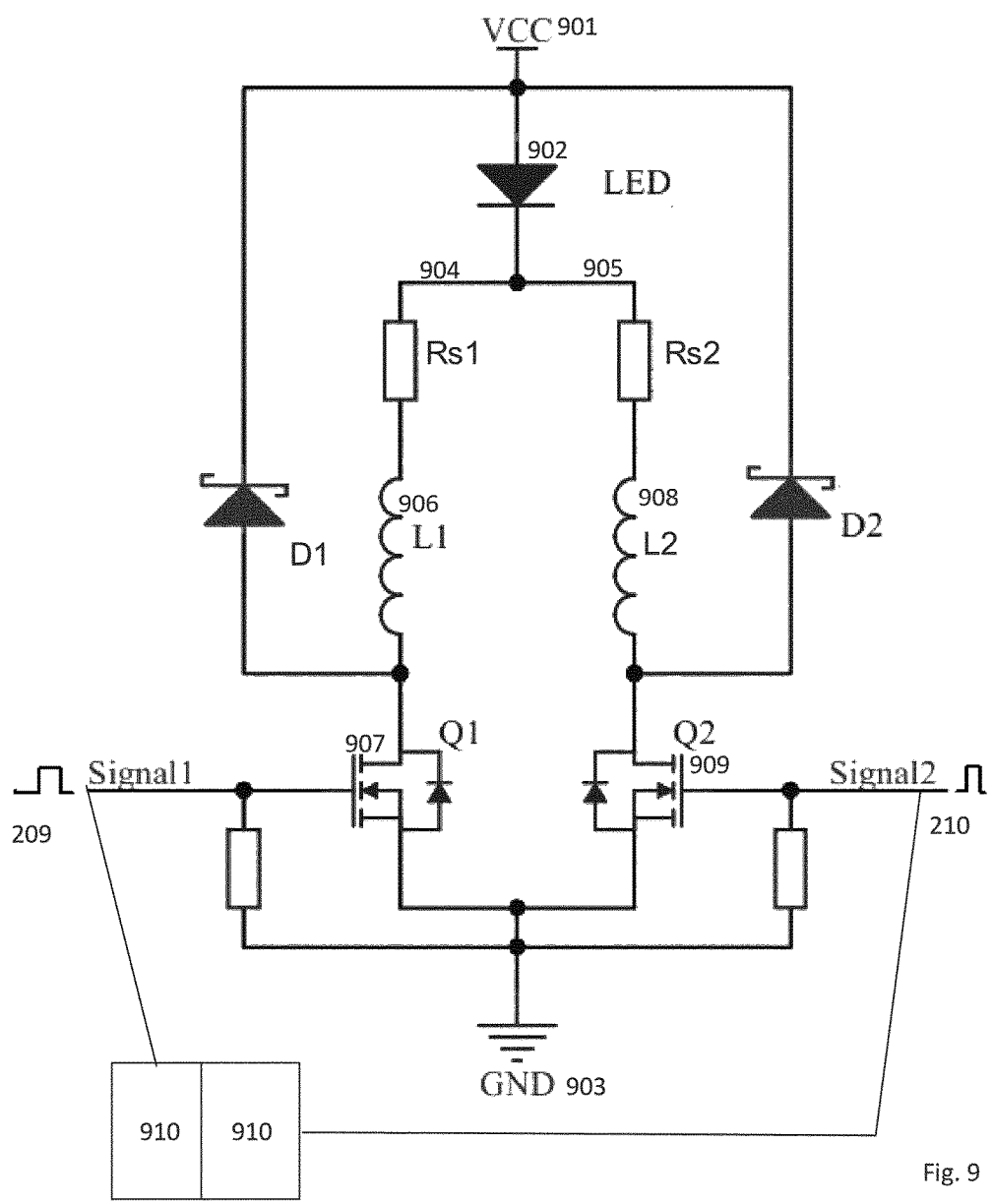
FIG. 9 shows a dual-pathway LED dimmer.
Figure 10:
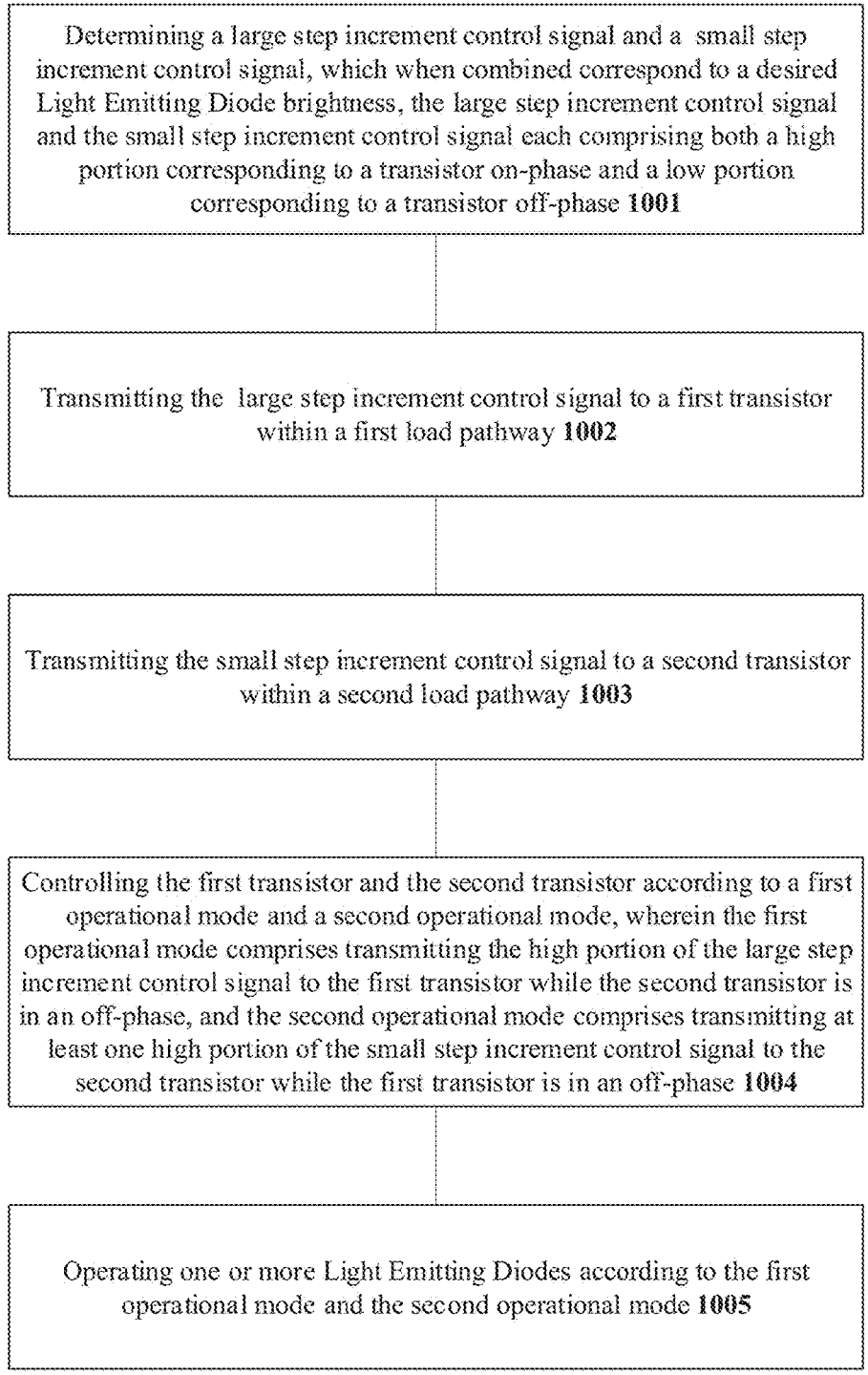
FIG. 10 shows a method for dual-pathway LED dimming.

FIG. 9 shows a dual-pathway light emitting diode dimmer, including a first reference voltage node 901; a load 902 including one or more light emitting diodes, the load connected in series with the first reference voltage node 901; a second reference voltage node 903; a first load pathway 904 and a second load pathway 905, connected in parallel between the load 902 and the second reference voltage node 903; wherein the first load pathway 904 includes a first inductor 906 and a first transistor 907, connected in series; and wherein a second load pathway 905 includes a second inductor 908 and a second transistor 909, connected in series; and one or more controllers 910, configured to control the first transistor 907 and the second transistor 908. FIG. 10 shows a method for dual-pathway Light Emitting Diode dimming, comprising:

determining a large step increment control signal and a small step increment control signal, which when combined correspond to a desired Light Emitting Diode brightness, the large step increment control signal and the small step increment control signal each comprising both a high portion corresponding to a transistor on-phase and a low portion corresponding to a transistor off-phase 1001; transmitting the large step increment control signal to a first transistor within a first load pathway 1002; transmitting the small step increment control signal to a second transistor within a second load pathway 1003; controlling the first transistor and the second transistor according to a first operational mode and a second operational mode, wherein the first operational mode comprises transmitting the high portion of the large step increment control signal to the first transistor while the second transistor is in an off-phase, and the second operational mode comprises transmitting at least one high portion of the small step increment control signal to the second transistor while the first transistor is in an off-phase 1004; and operating one or more Light Emitting Diodes according to the first operational mode and the second operational mode 1005.

The dimmer components may principally be understood to be configured along a first load pathway and a second load pathway. That is, from the load, there extend two load pathways, the pathways being connected in parallel between the load and a ground node or second voltage reference node, and the pathways including an inductor and a transistor connected in series. A controller is connected to the transistor along the first load pathway. Depending on the installation, the same or a different controller may be connected to the transistor along the second load pathway. The one or more controllers output signals to control the two transistors.

The one or more controllers generally control signals that cause the transistors to switch between an on-mode and an off-mode. That is, the signal includes a high portion which causes the transistor to enter an on-phase, as well as a low portion which causes the transistor the enter an off-phase. The control signal dictates the frequency at which the transistor switches between on and off. The transistor may be any kind of transistor capable of switching between an on and an off position, including, but not limited to, a field effect transistor and a MOSFET transistor.

An on-state of a transistor causes a current to flow through the transistor, and the off-state causes no current to flow through the transistor. Where a field effect transistor is used, the transistor source may be connected to a power source, and the transistor drain may be connected to a ground terminal/node or second voltage reference node. These connections may be direct or may include other components connected in series with the transistor in between. Where a field effect transistor is used, the field effect transistor may be, but need not be, a metal-oxide-semiconductor field effect transistor.

The transistor function may be understood according to a first operational mode and a second operational mode, wherein the first operational mode includes sending a high signal to the first transistor such that the first transistor is in an on-state, while sending no signal or a low signal to the second transistor such that the second transistor is in an off-state. The second operational mode includes sending a low signal or no signal to the first transistor such that the first transistor is in an off-state, while sending a signal with at least one high portion to the second transistor, such that the second transistor is in an on-state during at least a portion of the second operational mode.

Where the first transistor is a bipolar transistor, the first operational mode may permit a flow of current from the collector to the emitter, and the second operational mode may prohibit a flow of current from the collector to the emitter. Where the first transistor is a field effect transistor, the first operational mode may permit a flow of current from the source to the drain, and the second operational mode may permit either a reduced flow of current or zero current from the source to the drain.

The at least one controller may be configured such that the first operational mode and the second operational mode never occur concurrently. As such, the at least one controller may control the transistors such that the first transistor and the second transistor are never concurrently on. Operation of the transistors according to differing operational modes ensures that one load pathway permits a flow of current from the current input to the load, and the second load pathway permits a flow of current from an inductor to the load. Thus, concurrent operation according to differing operational modes permits the load to receive a combined current, wherein the combined current includes both current received from the power input node or first voltage reference node and current received from the discharge of an inductor.

The inductors may be selected according to desired current ranges. It is understood within the art that an inductor's inductive capacity depends at least on a number of inductive coils, an area of the inductive coils, and the material, if any, creating an inductive coil core. A skilled person will appreciate that the physical makeup of an inductive coil may be selected to meet a specified electrical demand. The two load pathways may be designated as a pathway for large step increment and small step increment. That is, the first pathway may be configured to transmit a current that is primarily responsible for the load's brightness, and the second the may be configured to transmit a second current that serves a refining function to increase the brightness between the increments available within the stepwise limitations of the controller and first lead. According to one aspect of the disclosure, the brightness ranges of the first load pathway and the second load pathway may be configured such that the brightness range of the second load pathway equals a stepwise increment of the brightness range of the first load pathway. According to another aspect of the disclosure, the brightness range of the second load pathway may be configured to be slightly smaller than a stepwise increment of the first load pathway. Thus, and according to this aspect of the disclosure, the second pathway dynamic range may include a number of increments i at an increment size s, and the second pathway dynamic range may be structured such that s(i+1)=a stepwise increment of the first dynamic range.

Where the first load pathway is designated as a high step increment load pathway, and the second load pathway is designated as a low step increment load pathway, the first inductor may be configured to store a greater charge in its magnetic field than the second inductor. This permits a larger dynamic range with corresponding larger step increment within the first load pathway, and a smaller range of dynamic range with corresponding smaller step increment within the second power range.

Although any controller offering any number of power control settings, and therefore any amount of dynamic range, may be used, it may be desirable within a particular configuration to use a commercially available controller that may offer a limited dynamic range. According to one aspect of the disclosure, a 7-bit dynamic range controller may be used, which may be widely commercially available. Where the controller is connected to a transistor, the controller may be able to control the transistor to transition among a limited number of control frequencies, each frequency corresponding to a change in brightness. A 7-bit controller may, for example, offer 128 stepwise increments of dynamic control. According to one aspect of the disclosure, a single controller with two control outputs may be used, such that the controller is able to control both the first transistor and the second transistor with the stepwise increments that correspond to the available bits. According to another aspect of the disclosure, two controllers may be used, such that a first controller controls the first load pathway, and the second controller controls the second load pathway. Where this occurs, a processor may be configured to send signals to each of the two controllers to cause the controllers to control the transistors according to a non-concurrent first operational mode and second operational mode.

The current ranges for the first load pathway and the second currently need are quite flexible and may be configured according to the desired LED implementation. It is recognized that one or more LEDs may operate best according to an optimal current, and thus optimal dimming may occur by interrupting a single and stable current, rather than increasing or decreasing the current itself.

The load may be connected to a power supply. The connection may be established, for example, with a VCC pin, referred to herein as the first reference voltage node. The power supply may be an alternating current power supply or a direct current power supply. Where the power supply is an alternating current power supply, the connection between the power supply in the load may optionally include an alternating current to direct current converter. The power supply may be connected in series with the load. The power supply may be a battery.

The load may include one or more light emitting diodes. The light emitting diodes may be in any color or combination of colors. According to one aspect of the disclosure, the light emitting diodes may be a combination of colors configured to emit a combined light output that is white or approximately white. The one or more light emitting diodes may be further configured with a phosphor converter.

The controller is configured to alternate between a first operational mode and a second operational mode, such that the first transistor and the second transistor are not concurrently in an on-position. The inductors along the first load pathway and the second load pathway are configured such that, when the controller causes a transistor to enter an off-position, the corresponding inductor along the load pathway releases a stored charge from its magnetic field which is then transferred to the load. Concurrently, the controller causes the transistor along the opposite load pathway to permit current to flow from the power source through the load pathway. Thus, the load receives a combined current, the combined current being the current flowing from the power source plus current being released by an inductor. Where this occurs, the inductor releasing the current is located on a load pathway opposite the load pathway carrying the current from the power source. In this manner, current from the power source flows disjointedly through the dimmer, such that power from the power source, in contrast with stored power within an inductor, flows through either the first load pathway or the second load pathway at a given time.

The dimmer may further include a plurality of diodes, wherein a diode is connected between a load pathway in an input of the load. The diode may be configured to permit one-way current flow from the load pathway to the input of the load. Thus, each load pathway may have its own diode, creating a one-way current flow from the load pathway to the load input. In this manner, a stored charge within the corresponding inductor is released at a time in which a corresponding transistor is closed. As such, a point of least resistance may be the diode connected to the corresponding load pathway, such that released or discharged energy from the inductor travels along the one-way current path created by the diode into the input of the load.

According to one aspect of the disclosure, a diode connected between a load pathway and an input of the load may be a Schottky diode. The Schottky diode may be configured to permit unidirectional current flow from the first inductor coil or the second inductor coil to the load input. Schottky diodes' lack of recovery time compared to a p-n junction diode may be well-suited to the requirement to rapidly switch between transistor signals.

Each load pathway may be configured with one or more resistors. The two resistors are measuring resistors for a high-side current sense amplifier and operate to close the control loop. A person skilled in the art will appreciate that such resistors permit current measurement by considering Ohm's law in light of a known resistance. A current measurement may be an element of a feedback system, in which it is determined whether the controller signals result in the desired current to the load. The switch may alternatively be constructed to permit current measurement at other locations, such as, without limitation, at the load or a node along the first pathway or the second pathway. Where measurement results are suboptimal, the feedback system may modify the control signals 211 and 212, or where available, the VCC (first reference voltage) to achieve the desired result.

It is expressly noted that the resistors depicted and/or described herein may be optional components of a high-side current sense amplifier and may be omitted from the dimmer while maintaining dimming function. It is also noted that the diodes connected in parallel to the transistors in FIG. 2 may also be optional and should not be understood to be a required component of the dimmer.

The dimming device and procedures described herein may be used within a UAV light show. It is known to fly light-equipped UAVs to form figures, images, and/or words in the context of a light show. This requires the ability to direct the one or more UAVs to a specific location, as well as the ability to change at least the brightness of the light connected to the UAV. The changes in brightness may include turning the light on or off, as well as powering the light among a range of power controls, such as among a range between zero power and 100% power.

UAVs within the context of a light show may be quite far from human observers. They may perform a light show in an environment of partial illumination or only partial visibility. For any of these factors, it may be desirable for a UAV light to be powered within a large dynamic range. That is, it may be desirable for the light to range from zero power, or nearly zero power, to extremely bright. As the dynamic range increases, the limited incremental settings of a conventional controller become more apparent, and it becomes less possible to incrementally control a UAV light such that it appears to have a gradual increase or decrease in power. Rather, as the dynamic range increases, incremental changes according to a controller power capability will appear more stepwise rather than gradient, which may be undesirable in a light show context. Accordingly, the dimmer described herein, which offers additional dimming control, may provide additional gradient or dimming smoothness and may therefore be more desirable for at least light show usage. Nothing in this disclosure, however, shall be understood to limit the dimmer disclosed herein to a UAV light show.

According to an aspect of the disclosure, two or more dimmers may be combined to create a color-adjustable light. It is known to combine LEDs of various colors to form a desired resulting color. For example, one or more red LEDs, one or more green LEDs, and/or one or more blue LEDs may be combined to form a large spectrum of light colors, including white light. Custom control of resulting light color requires a high degree of control of individual color brightness. As such, one or more dimmers may be used with a light configuration including a plurality of light colors, such that a dimmer is programmed to control fewer than all of the lighting colors. According to one aspect of the disclosure, a color-adjustable light may be configured with one or more red LEDs, one or more green LEDs, and one or more blue LEDs. The color-adjustable light may be further configured to have a dimmer as disclosed herein for at least one of the red color, green color, and blue color. Thus, any color of LEDs equipped with a dimmer could be individually adjusted within a high degree of ability to reach a specified brightness, thereby enabling high customization of resulting colors. Where two or more light colors are combined to form a mixed light color, the appreciated hue of the mixed light color can be changed by changing the intensity of only one color. Accordingly, a single dimmer for one color in a mixed light may change the overall hue of a mixed light. Where three dimmers are used such that each dimmer controls one of red, green, or blue light, a highly customizable mixed color may be achieved at a variety of light intensities.

In the following, various examples are provided with reference to the aspects described above.

In Example 1, a dual-pathway light emitting diode dimmer is disclosed, comprising a first reference voltage node; a load comprising one or more light emitting diodes, the load connected in series with the first reference voltage node; a second reference voltage node; a first load pathway and a second load pathway, connected in parallel between the load and the second reference voltage node; wherein the first load pathway comprises a first inductor and a first transistor, connected in series; and wherein a second load pathway comprises a second inductor and a second transistor, connected in series; and one or more controllers, configured to control the first transistor and the second transistor.

In Example 2, the dual-pathway light emitting diode dimmer of Example 1 is disclosed, wherein the one or more controllers is connected to a control terminal of the first transistor and a control terminal of the second transistor.

In Example 3, the dual-pathway light emitting diode dimmer of Example 1 is disclosed, wherein the first transistor and the second transistor are field effect transistors.

In Example 4, the dual-pathway light emitting diode dimmer of Example 3 is disclosed, wherein the field effect transistors are metal-oxide-semiconductor field-effect transistors.

In Example 5, the dual-pathway light emitting diode dimmer of Example 3 or 4 is disclosed, wherein the one or more controllers is connected to a gate of the first transistor and a gate of the second transistor.

In Example 6, the dual-pathway light emitting diode dimmer of any one of Examples 1 to 5 is disclosed, wherein the one or more controllers are further configured to cause the first transistor and the second transistor to alternate between a first operational mode and a second operational mode.

In Example 7, the dual-pathway light emitting diode dimmer of any one of Examples 1 to 5 is disclosed, further comprising a logic gate, said logic gate being connected between at least one of the one or more controllers and the second transistor is disclosed, wherein the at least one of the one or more controllers and the logic gate are configured to cause the first transistor and the second transistor to alternate between a first operational mode and a second operational mode.

In Example 8, the dual-pathway light emitting diode dimmer of Examples 6 or 7 is disclosed, wherein the first operational mode comprises transmitting a high signal to the first transistor while the second transistor is in an off-state; and the second operational mode comprises transmitting a signal with at least one high portion to the second transistor while the first transistor is in an off-state.

In Example 9, the dual-pathway light emitting diode dimmer of Example 6 or 7 is disclosed, wherein the one or more controllers is configured to synchronously cause the first transistor and the second transistor to switch operational modes.

In Example 10, the dual-pathway light emitting diode dimmer of any one of Examples 6 to 9 is disclosed, wherein the first operational mode controls a first dynamic range with first step increment, and the second operational mode controls a second dynamic range with second step increment is disclosed, wherein the first dynamic range is larger than the second dynamic range, and wherein the first step increment is larger than the second step increment.

In Example 11, the dual-pathway light emitting diode dimmer of Example 10 is disclosed, wherein the second dynamic range is smaller than a stepwise increment of the first dynamic range.

In Example 12, the dual-pathway light emitting diode dimmer of Example 10 is disclosed, wherein the second dynamic range equals a stepwise increment of the first dynamic range.

In Example 13, the dual-pathway light emitting diode dimmer of any one of Examples 1 to 12 is disclosed, further comprising a power supply, connected in series with power input node.

In Example 14, the dual-pathway light emitting diode dimmer of Example 13 is disclosed, wherein a first operational mode causes current to travel from the power supply, to the load, and into the first load pathway.

In Example 15, the dual-pathway light emitting diode dimmer of Example 14 is disclosed, wherein a second operational mode causes current to travel from the first inductor in the first load pathway into an input of the load.

In Example 16, the dual-pathway light emitting diode dimmer of any one of Examples 13 to 15 is disclosed, wherein the power supply is a direct current power supply.

In Example 17, the dual-pathway light emitting diode dimmer of any one of Examples 13 to 16 is disclosed, wherein the power supply is a battery.

In Example 18, the dual-pathway light emitting diode dimmer of any one of Examples 1 to 17 is disclosed, wherein the dimmer is configured to cause the load to receive a current traveling from the power input node and a current being discharged from an inductor.

In Example 19, the dual-pathway light emitting diode dimmer of any one of Examples 1 to 17 is disclosed, wherein the dimmer is configured to transmit a combined current to the load, the combined current being a sum of a current corresponding to a current flowing through the first transistor and a current being discharged from the second inductor.

In Example 20, the dual-pathway light emitting diode dimmer of any one of Examples 1 to 19 is disclosed, wherein the one or more controllers are configured to perform disjoint control of the first transistor and the second transistor.

In Example 21, the dual-pathway light emitting diode dimmer of any one of Examples 1 to 20 is disclosed, wherein the dimmer is configured to conduct current stored within the first inductor to the load when the first transistor is switched off, and the dimmer is configured to conduct current stored within the second inductor to the load when the second transistor is switched off.

In Example 22, the dual-pathway light emitting diode dimmer of any one of Examples 1 to 21 is disclosed, wherein the dimmer is configured to simultaneously conduct to the load a stored current from an inductor whose serially-connected transistor is switched off and an active current corresponding to an inductor whose serially-connected transistor is switched on.

In Example 23, the dual-pathway light emitting diode dimmer of any one of Examples 1 to 22 is disclosed, further comprising a diode connected in series between an output of the first transistor and an input of the load, and a diode connected in series between an output of the second transistor and an input of the load.

In Example 24, the dual-pathway light emitting diode dimmer of Example 23 is disclosed, wherein the diode permits single-direction current flow from either the first load pathway or the second load pathway to a load input.

In Example 25, the dual-pathway light emitting diode dimmer of Example 23 is disclosed, wherein the diode is a Schottky diode, which permits single-direction current flow from the first load pathway to a load input.

In Example 26, the dual-pathway light emitting diode dimmer of any one of Examples 1 to 25 is disclosed, further comprising a first resistor along the first load pathway, connected in series to the first inductor, and a second resistor along the second load pathway, connected in series to the second inductor, the first resistor and second resistor being measurement resistors for determining a current measurement along the first load pathway and the second load pathway.

In Example 27, a color-adjustable light is disclosed comprising a first reference voltage node; a first load, connected to the first reference voltage node, comprising one or more light emitting diodes of a first color; a second load, connected to the first reference voltage node, comprising one or more light emitting diodes of a second color; a second reference voltage node; a first load pathway and a second load pathway, connected in parallel between the second reference voltage node and either the first load or the second load; wherein the first load pathway comprises a first inductor and a first transistor, connected in series; and wherein a second load pathway comprises a second inductor and a second transistor, connected in series; and one or more controllers, configured to control the first transistor and the second transistor.

In Example 28, the color-adjustable light of Example 27 is disclosed, further comprising a third load, connected to the first reference voltage node, comprising one or more light emitting diodes of a third color.

In Example 29, a method for dual-pathway Light Emitting Diode dimming is disclosed, comprising determining a large step increment control signal and a small step increment control signal, which when combined correspond to a desired Light Emitting Diode brightness, the large step increment control signal and the small step increment control signal each comprising both a high portion corresponding to a transistor on-phase and a low portion corresponding to a transistor off-phase; transmitting the large step increment control signal to a first transistor within a first load pathway, transmitting the small step increment control signal to a second transistor within a second load pathway; controlling the first transistor and the second transistor according to a first operational mode and a second operational mode, wherein the first operational mode comprises transmitting the high portion of the large step increment control signal to the first transistor while the second transistor is in an off-phase, and the second operational mode comprises transmitting at least one high portion of the small step increment control signal to the second transistor while the first transistor is in an off-phase; and operating one or more Light Emitting Diodes according to the first operational mode and the second operational mode.

In Example 30, the method for dual-pathway Light Emitting Diode dimming of Example 29 is disclosed, further comprising powering the one or more Light Emitting Diodes in the first operational mode with current from a first reference voltage node according to the high portion of the large step increment control signal and a discharge from an inductor electrically connected to the second transistor.

In Example 31, the method for dual-pathway Light Emitting Diode dimming of Example 29 or 30 is disclosed, further comprising powering the one or more Light Emitting Diodes in the second operational mode with current from a first reference voltage node according to the high portion of the small step increment control signal and a discharge from an inductor electrically connected to the first transistor.

In Example 32, a means of dual-pathway Light Emitting Diode diming is disclosed, comprising a first reference voltage means; a lighting means comprising one or more light emitting diodes, the lighting means connected in series with the first reference voltage means;

a second reference voltage means; a first conductive pathway and a second conductive pathway, connected in parallel between the lighting means and the second reference voltage means; wherein the first conductive pathway comprises a first inductive means and a first switching means, connected in series; and wherein a second conductive pathway comprises a second inductive means and a second switching means, connected in series; and one or more controlling means, configured to control the first switching means and the second switching means.

In Example 33, the means of dual-pathway Light Emitting Diode diming of Example 32 is disclosed, wherein the controlling means is connected to a control terminal of the first switching means and a control terminal of the second switching means.

In Example 34, the means of dual-pathway Light Emitting Diode diming of Example 32 is disclosed, wherein the first switching means and the second switching means are field effect switching means.

In Example 35, the means of dual-pathway Light Emitting Diode diming of Example 34 is disclosed, wherein the field effect switching means are metal-oxide-semiconductor field-effect switching transistors.

In Example 36, the means of dual-pathway Light Emitting Diode diming of Example 34 or 35 is disclosed, wherein the controlling means is connected to a gate of the first switching means and a gate of the second switching means.

In Example 37, the means of dual-pathway Light Emitting Diode diming of any one of Examples 32 to 36 is disclosed, wherein the one or more controlling means are further configured to cause the first switching means and the second switching means to alternate between a first operational mode and a second operational mode.

In Example 38, the means of dual-pathway Light Emitting Diode diming of any one of Examples 32 to 36 is disclosed, further comprising a logical routing means, said logical routing means being connected between at least one of the one or more controlling means and the second switching means is disclosed, wherein the at least one of the one or more controlling means and the logical routing means are configured to cause the first switching means and the second switching means to alternate between a first operational mode and a second operational mode.

In Example 39, the means of dual-pathway Light Emitting Diode diming of Examples 37 or 38 is disclosed, wherein the first operational mode comprises transmitting a high signal to the first switching means while the second switching means is in an off-state; and the second operational mode comprises transmitting a signal with at least one high portion to the second switching means while the first switching means is in an off-state.

In Example 40, the means of dual-pathway Light Emitting Diode diming of Example 37 or 38 is disclosed, wherein the controlling means is configured to synchronously cause the first switching means and the second switching means to switch operational modes.

In Example 41, the means of dual-pathway Light Emitting Diode diming of any one of Examples 37 to 40 is disclosed, wherein the first operational mode controls a first dynamic range with large step increment, and the second operational mode controls a second dynamic range with small step increment.

In Example 42, the means of dual-pathway Light Emitting Diode diming of Example 41 is disclosed, wherein the second dynamic range is smaller than a stepwise increment of the first dynamic range.

In Example 43, the means of dual-pathway Light Emitting Diode diming of Example 41 is disclosed, wherein the second dynamic range equals a stepwise increment of the first dynamic range.

In Example 44, the means of dual-pathway Light Emitting Diode diming of any one of Examples 32 to 43 is disclosed, further comprising a power supply means, connected in series with first reference voltage means.

In Example 45, the means of dual-pathway Light Emitting Diode diming of Example 44 is disclosed, wherein a first operational mode causes current to travel from the power supply means, to the lighting means, and into the first conductive pathway.

In Example 46, the means of dual-pathway Light Emitting Diode diming of Example 44 is disclosed, wherein a second operational mode causes current to travel from the first inductive means in the first conductive pathway into an input of the lighting means.

In Example 47, the means of dual-pathway Light Emitting Diode diming of any one of Examples 44 to 46 is disclosed, wherein the power supply means is a direct current power supply.

In Example 48, the means of dual-pathway Light Emitting Diode diming of any one of Examples 44 to 47 is disclosed, wherein the power supply means is a battery.

In Example 49, the means of dual-pathway Light Emitting Diode diming of any one of Examples 32 to 48 is disclosed, wherein the means of dual-pathway Light Emitting Diode diming is configured to cause the lighting means to receive a current traveling from the first reference voltage means and a current being discharged from an inductive means.

In Example 50, the means of dual-pathway Light Emitting Diode diming of any one of Examples 32 to 48 is disclosed, wherein the means of dual-pathway Light Emitting Diode diming is configured to transmit a combined current to the lighting means, the combined current being a sum of a current corresponding to a current flowing through the first switching means and a current being discharged from the second inductive means.

In Example 51, the means of dual-pathway Light Emitting Diode diming of any one of Examples 32 to 50 is disclosed, wherein the one or more controlling means are configured to perform disjoint control of the first switching means and the second switching means.

In Example 52, the means of dual-pathway Light Emitting Diode diming of any one of Examples 32 to 51 is disclosed, wherein the means of dual-pathway Light Emitting Diode diming is configured to conduct current stored within the first inductive means to the lighting means when the first switching means is switched off, and the means of dual-pathway Light Emitting Diode diming is configured to conduct current stored within the second inductive means to the lighting means when the second switching means is switched off.

In Example 53, the means of dual-pathway Light Emitting Diode diming of any one of Examples 32 to 52 is disclosed, wherein the means of dual-pathway Light Emitting Diode diming is configured to simultaneously conduct to the lighting means a stored current from an inductive means whose serially-connected switching means is switched off and an active current corresponding to an inductive means whose serially-connected switching means is switched on.

In Example 54, the means of dual-pathway Light Emitting Diode diming of any one of Examples 32 to 53 is disclosed, further comprising a diode connected in series between an output of the first switching means and an input of the lighting means, and a diode connected in series between an output of the second switching means and an input of the lighting means.

In Example 55, the means of dual-pathway Light Emitting Diode diming of Example 54 is disclosed, wherein the diode permits single-direction current flow from either the first conductive pathway or the second conductive pathway to a lighting means input.

In Example 56, the means of dual-pathway Light Emitting Diode diming of Example 54 is disclosed, wherein the diode is a Schottky diode, which permits single-direction current flow from the first conductive pathway to a lighting means input.

In Example 57, the means of dual-pathway Light Emitting Diode diming of any one of Examples 32 to 56 is disclosed, further comprising a first resistor along the first conductive pathway, connected in series to the first inductive means, and a second resistor along the second conductive pathway, connected in series to the second inductive means, the first resistor and second resistor being measurement resistors for along the first load pathway and the second load pathway.

In Example 58, a means of color-adjustable lighting is disclosed, comprising:

a first reference voltage means; a first lighting means, connected to the first reference voltage means, comprising one or more light emitting diodes of a first color; a second lighting means, connected to the first reference voltage means, comprising one or more light emitting diodes of a second color; a second reference voltage means; a first conductive pathway and a second conductive pathway, connected in parallel between the second reference voltage means and either the first lighting means or the second lighting means; wherein the first conductive pathway comprises a first inductive means and a first switching means, connected in series; and wherein a second conductive pathway comprises a second inductive means and a second switching means, connected in series; and one or more controlling means, configured to control the first switching means and the second switching means.

In Example 59, the means of color adjustable lighting of Example 58 is disclosed, further comprising a third lighting means, connected to the first reference voltage means, comprising one or more light emitting diodes of a third color.

In Example 60, a circuit is disclosed, comprising a first reference voltage node;

a load comprising one or more light emitting diodes, the load connected in series with the first reference voltage node; a second reference voltage node; a first load pathway and a second load pathway, connected in parallel between the load and the second reference voltage node; wherein the first load pathway comprises a first inductor and a first transistor, connected in series; and wherein a second load pathway comprises a second inductor and a second transistor, connected in series; and one or more processors configured to either activate the first transistor while the second transistor is deactivated or activate the second transistor while the first transistor is deactivated.

In Example 61, the circuit of Example 60 is disclosed, wherein the one or more processors is connected to a control terminal of the first transistor and a control terminal of the second transistor.

In Example 62, the circuit of Example 60 is disclosed, wherein the first transistor and the second transistor are field effect transistors.

In Example 63, the circuit of Example 62 is disclosed, wherein the field effect transistors are metal-oxide-semiconductor field-effect transistors.

In Example 64, the circuit of Example 62 or 63 is disclosed, wherein the one or more processors is connected to a gate of the first transistor and a gate of the second transistor.

In Example 65, the circuit of any one of Examples 60 to 64 is disclosed, wherein the one or more processors are further configured to cause the first transistor and the second transistor to alternate between a first operational mode and a second operational mode.

In Example 66, the circuit of any one of Examples 60 to 64 is disclosed, further comprising a logic gate, said logic gate being connected between at least one of the one or more processors and the second transistor is disclosed, wherein the at least one of the one or more processors and the logic gate are configured to cause the first transistor and the second transistor to alternate between a first operational mode and a second operational mode.

In Example 67, the circuit of Examples 65 or 66 is disclosed, wherein the first operational mode comprises transmitting a high signal to the first transistor while the second transistor is in an off-state; and the second operational mode comprises transmitting a signal with at least one high portion to the second transistor while the first transistor is in an off-state.

In Example 68, the circuit of Example 65 or 66 is disclosed, wherein the one or more processors is configured to synchronously cause the first transistor and the second transistor to switch operational modes.

In Example 69, the circuit of any one of Examples 65 to 68 is disclosed, wherein the first operational mode controls a first dynamic range with a first step increment, and the second operational mode controls a second dynamic range with a second step increment is disclosed, wherein the first dynamic range is larger than the second dynamic range, and wherein the first step increment is larger than the second step increment.

In Example 70, the circuit of Example 69 is disclosed, wherein the second dynamic range is smaller than a stepwise increment of the first dynamic range.

In Example 71, the circuit of Example 69 is disclosed, wherein the second dynamic range equals a stepwise increment of the first dynamic range.

In Example 72, the circuit of any one of Examples 60 to 71 is disclosed, further comprising a power supply, connected in series with power input node.

In Example 73, the circuit of Example 72 is disclosed, wherein a first operational mode causes current to travel from the power supply, to the load, and into the first load pathway.

In Example 74, the circuit of Example 73 is disclosed, wherein a second operational mode causes current to travel from the first inductor in the first load pathway into an input of the load.

In Example 75, the circuit of any one of Examples 72 to 74 is disclosed, wherein the power supply is a direct current power supply.

In Example 76, the circuit of any one of Examples 72 to 75 is disclosed, wherein the power supply is a battery.

In Example 77, the circuit of any one of Examples 60 to 76 is disclosed, wherein the circuit is configured to cause the load to receive a current traveling from the power input node and a current being discharged from an inductor.

In Example 78, the circuit of any one of Examples 60 to 76 is disclosed, wherein the circuit is configured to transmit a combined current to the load, the combined current being a sum of a current corresponding to a current flowing through the first transistor and a current being discharged from the second inductor.

In Example 79, the circuit of any one of Examples 60 to 78 is disclosed, wherein the one or more processors are configured to perform disjoint control of the first transistor and the second transistor.

In Example 80, the circuit of any one of Examples 60 to 79 is disclosed, wherein the circuit is configured to conduct current stored within the first inductor to the load when the first transistor is switched off, and the circuit is configured to conduct current stored within the second inductor to the load when the second transistor is switched off.

In Example 81, the circuit of any one of Examples 60 to 80 is disclosed, wherein the circuit is configured to simultaneously conduct to the load a stored current from an inductor whose serially-connected transistor is switched off and an active current corresponding to an inductor whose serially-connected transistor is switched on.

In Example 82, the circuit of any one of Examples 60 to 81 is disclosed, further comprising a diode connected in series between an output of the first transistor and an input of the load, and a diode connected in series between an output of the second transistor and an input of the load.

In Example 83, the circuit of Example 82 is disclosed, wherein the diode permits single-direction current flow from either the first load pathway or the second load pathway to a load input.

In Example 84, the circuit of Example 82 is disclosed, wherein the diode is a Schottky diode, which permits single-direction current flow from the first load pathway to a load input.

In Example 85, the circuit of any one of Examples 60 to 84 is disclosed, further comprising a first resistor along the first load pathway, connected in series to the first inductor, and a second resistor along the second load pathway, connected in series to the second inductor, the first resistor and second resistor being measurement resistors for along the first load pathway and the second load pathway.

While the dimmer device has been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A dual-pathway light emitting diode dimmer, comprising:
   a first reference voltage node;
   a load comprising one or more light emitting diodes, the load connected in series with the first reference voltage node;
   a second reference voltage node;
   a first load pathway and a second load pathway, connected in parallel between the load and the second reference voltage node;
   wherein the first load pathway comprises a first inductor and a first transistor, connected in series; and
   wherein a second load pathway comprises a second inductor and a second transistor, connected in series; and
   one or more controllers, configured to control the first transistor and the second transistor.

2. The dual-pathway light emitting diode dimmer of claim 1, wherein the one or more controllers is connected to a control terminal of the first transistor and a control terminal of the second transistor.

3. The dual-pathway light emitting diode dimmer of claim 1, wherein the one or more controllers are further configured to cause the first transistor and the second transistor to alternate between a first operational mode and a second operational mode.

4. The dual-pathway light emitting diode dimmer of claim 1, further comprising a logic gate, said logic gate being connected between at least one of the one or more controllers and the second transistor, wherein the at least one of the one or more controllers and the logic gate are configured to cause the first transistor and the second transistor to alternate between a first operational mode and a second operational mode.

5. The dual-pathway light emitting diode dimmer of claim 4, wherein the first operational mode comprises transmitting a high signal to the first transistor while the second transistor is in an off-state; and the second operational mode comprises transmitting a signal with at least one high portion to the second transistor while the first transistor is in an off-state.

6. The dual-pathway light emitting diode dimmer of claim 4, wherein the one or more controllers is configured to synchronously cause the first transistor and the second transistor to switch operational modes.

7. The dual-pathway light emitting diode dimmer of claim 4, wherein the first operational mode controls a first dynamic range with first step increment, and the second operational mode controls a second dynamic range with second step increment, wherein the first dynamic range is larger than the second dynamic range, and wherein the first step increment is larger than the second step increment.

8. The dual-pathway light emitting diode dimmer of claim 7, wherein the second dynamic range is smaller than a stepwise increment of the first dynamic range.

9. The dual-pathway light emitting diode dimmer of claim 1, further comprising a power supply, connected in series with power input node, wherein a first operational mode causes current to travel from the power supply, to the load, and into the first load pathway.

10. The dual-pathway light emitting diode dimmer of claim 9, wherein a second operational mode causes current to travel from the first inductor in the first load pathway into an input of the load.

11. The dual-pathway light emitting diode dimmer of claim 1, wherein the dimmer is configured to cause the load to receive a current traveling from the power input node and a current being discharged from an inductor.

12. The dual-pathway light emitting diode dimmer of claim 1, further comprising a diode connected in series between an output of the first transistor and an input of the load, and a diode connected in series between an output of the second transistor and an input of the load, wherein the diode permits single-direction current flow from either the first load pathway or the second load pathway to a load input.

13. A color-adjustable light comprising:
a first reference voltage node;
a first load, connected to the first reference voltage node, comprising one or more light emitting diodes of a first color;
a second load, connected to the first reference voltage node, comprising one or more light emitting diodes of a second color;
a second reference voltage node;
a first load pathway and a second load pathway, connected in parallel between the second reference voltage node and either the first load or the second load;
wherein the first load pathway comprises a first inductor and a first transistor, connected in series; and
wherein a second load pathway comprises a second inductor and a second transistor, connected in series; and
one or more controllers, configured to control the first transistor and the second transistor.

14. The color-adjustable light of claim 13, further comprising a third load, connected to the first reference voltage node, comprising one or more light emitting diodes of a third color.

15. A method for dual-pathway Light Emitting Diode dimming, comprising:
determining a large step increment control signal and a small step increment control signal, which when combined correspond to a desired Light Emitting Diode brightness, the large step increment control signal and the small step increment control signal each comprising both a high portion corresponding to a transistor on-phase and a low portion corresponding to a transistor off-phase;
transmitting the large step increment control signal to a first transistor within a first load pathway,
transmitting the small step increment control signal to a second transistor within a second load pathway;
controlling the first transistor and the second transistor according to a first operational mode and a second operational mode, wherein the first operational mode comprises transmitting the high portion of the large step increment control signal to the first transistor while the second transistor is in an off-phase, and the second operational mode comprises transmitting at least one high portion of the small step increment control signal to the second transistor while the first transistor is in an off-phase; and
operating one or more Light Emitting Diodes according to the first operational mode and the second operational mode.

16. The method for dual-pathway Light Emitting Diode dimming of claim 15, further comprising powering the one or more Light Emitting Diodes in the first operational mode with current from a first reference voltage node according to the high portion of the large step increment control signal and a discharge from an inductor electrically connected to the second transistor.

17. The method for dual-pathway Light Emitting Diode dimming of claim 15, further comprising powering the one or more Light Emitting Diodes in the second operational mode with current from a first reference voltage node according to the high portion of the small step increment control signal and a discharge from an inductor electrically connected to the first transistor.

18. A means of dual-pathway Light Emitting Diode diming, comprising:
a first reference voltage means;
a lighting means comprising one or more light emitting diodes, the lighting means connected in series with the first reference voltage means;
a second reference voltage means;
a first conductive pathway and a second conductive pathway, connected in parallel between the lighting means and the second reference voltage means;
wherein the first conductive pathway comprises a first inductive means and a first switching means, connected in series; and
wherein a second conductive pathway comprises a second inductive means and a second switching means, connected in series; and
one or more controlling means, configured to control the first switching means and the second switching means.

19. The means of dual-pathway Light Emitting Diode diming of claim 18, wherein the controlling means is connected to a control terminal of the first switching means and a control terminal of the second switching means.

20. The means of dual-pathway Light Emitting Diode diming of claim 18, wherein the one or more controlling means are further configured to cause the first switching means and the second switching means to alternate between a first operational mode and a second operational mode.

* * * * *